(12) United States Patent
Kuroda et al.

(10) Patent No.: US 6,251,205 B1
(45) Date of Patent: Jun. 26, 2001

(54) METHOD OF MANUFACTURING RADIAL TIRE HAVING WOUND BAND

(75) Inventors: Yutaka Kuroda, Kobe; Masayuki Sakamoto, Shirakawa; Toshihiko Omokawa, Fukushima-ken; Kazuya Suzuki, Shirakawa, all of (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/213,901

(22) Filed: Dec. 17, 1998

Related U.S. Application Data (62) Division of application No. 08/915,650, filed on Aug. 20, 1997, now Pat. No. 5,972,142.

(30) Foreign Application Priority Data

Aug. 20, 1996 (JP) .................................... 8-218881
Aug. 23, 1996 (JP) .................................... 8-222817
Aug. 23, 1996 (JP) .................................... 8-222818

(51) Int. Cl.[7] ............................. B29D 30/26; B06C 9/22
(52) U.S. Cl. ...................... 156/117; 152/531; 152/533; 156/130; 156/397; 156/414
(58) Field of Search .................... 156/117, 397, 156/414, 417, 418, 419, 420, 130; 152/531, 533, 454

(56) References Cited

U.S. PATENT DOCUMENTS

| 4,824,501 | 4/1989 | Ushikubo et al. . |
| 5,032,198 | 7/1991 | Kojima et al. . |
| 5,308,437 | 5/1994 | Osa . |
| 5,562,792 | 10/1996 | Caretta . |

FOREIGN PATENT DOCUMENTS

| 0415684 A2 | 3/1991 | (EP) . |
| 1487426 | 9/1977 | (GB) . |

*Primary Examiner*—Geoffrey L. Knable
(74) *Attorney, Agent, or Firm*—Birch, Stewart, Kolasch & Birch, LLP (57) ABSTRACT

A method of manufacturing a radial tire is disclosed, wherein a tread ring is formed separately from a tire main body by the use of a tread ring forming apparatus. The radial tire comprises a belt having a camber and a band wound thereon. The tread ring is an annular assembly of a raw belt, a raw band wound thereon and a raw tread rubber. The tread ring forming apparatus comprising a belt drum made up of segments defining the drum circumference. In a cross section including the belt drum axis, the radially outer surface of each segment is a straight line parallel to the axis. In a cross section normal to the belt drum axis, the radially outer surface is an arc having one radius substantially equal to one half of the drum diameter, but the drum circumference is decreased in the belt edge portion than the central portion by increasing gaps between the segments.

8 Claims, 10 Drawing Sheets

METHOD OF MANUFACTURING RADIAL TIRE HAVING WOUND BAND

This application is a continuation divisional of Application Ser. No. 08/915,650, filed on Aug. 20, 1997, now U.S. Pat. No. 5,972,142, the entire contents of which are hereby incorporated by reference.

BACKGROUND OF THE INVENTION

The present invention relates to a method of manufacturing a radial tire having a belt (breaker) and a band wound thereon, more particularly to a method of forming a tread ring separately from a tire main body, and also relates to a tread ring forming apparatus.

In general, high speed radial tires for passenger cars, sport cars and the like are provided with a belt (breaker) As the belt cord angle is relatively large with respect to the circumferential direction, the hoop effect is less and the belt is liable to be lifted by high speed rotation. Thus, a band whose cord angle is substantially zero is further wound on the belt to provide a tight hoop effect.

On the other hand, the tire tread is usually provided with a camber. Therefore, it is preferable that the belt is also provided with a similar camber.

Such a belt camber can be obtained by a profiled belt drum of which profile is a convex line in a cross section including the drum axis and also a convex line in a cross section normal to the drum axis. Namely, the drum has a three-dimensional curvature. Such a drum is disclosed in Japanese patent publication Nos. JP-B2-5-44914 and JP-B2-6-51368. In practice, however, due to high cost, it is difficult to prepare or make such a profiled belt drum for various tire sizes. Further, it is almost impossible to exactly adjust or control the three-dimensional curvature according to the output.

Therefore, sometimes the belt camber is decreased to almost zero, though the tread camber is maintained. As a result, in the vulcanizing mold, the tread rubber is liable to be moved and compressed unevenly especially in the tire shoulder portion to disturb the uniformity of the tire.

Further, the radially inward compressive force that the belt and band receive from the inside of the mold is relatively large in the belt edge portions than the center due to the curvature corresponding to the tread camber. As a result, the band tension decreases in the tire shoulder and the high speed durability decreases.

SUMMARY OF THE INVENTION

Therefore, a primary object of the present invention is to provide a radial tire having a belt and band whose dimensions are accurately controlled to improve the tire uniformity and the like.

Another object of the present invention is to provide a method of manufacturing such a radial tire by the use of a belt drum comprising novel segments.

Still another object of the present invention is to provide a tread ring forming apparatus including the belt drum.

Still more another object of the present invention is to provide a method of forming a tread ring by the use of the tread ring forming apparatus.

According to one aspect of the present invention, a method of manufacturing a radial tire comprises a process of making a tread ring by the use of a belt drum, the process of making a tread ring comprising the steps of forming a raw belt by winding a strip of rubberized high modulus cords on the belt shaping face, forming a raw band by winding at least one organic fiber cord on the radially outside of the raw belt at an angle of 0 to 5 degrees to the circumferential direction of the drum, and forming a raw tread portion by applying a strip of raw tread rubber on the radially outside of the assembly of the raw belt and raw band. The radial tire comprising a carcass extending between bead portions, a belt disposed radially outside the carcass, the belt having a belt camber (A) of 2 to 4 % of the section width of the tire and an outside diameter (2Rc) at the tire equator, and a band disposed radially outside the belt and inside a tread rubber. The belt drum comprises segments arranged around the axis of the belt drum, the segments being movable radially between a radially inner position and a radially outer position, each segment having a radially outer surface, the radially outer surfaces of the segments in the radially outer position collectively forming a belt shaping face for supporting the radially inside of a belt material wound thereon. In the tread ring, the inside circumference Bc of the raw band at the tire equator is $$2Rc \times \pi \times a$$

and the inside circumference Be of the raw band 7 at the axial edges of the raw belt is $$2(Rc-A) \times \pi \times a \times b$$

where $0.94 \leq a \leq 0.99$, $0.97 \leq b < 1.0$.

BRIEF DESCRIPTION OF THE DRAWINGS

FIGS. 8(a) and (b) are diagrams showing examples of the outer surface 14a of the segment 14.

DESCRIPTION OF THE PREFERRED EMBODIMENTS

The present invention is mainly concerned with a radial tire for passenger cars especially for high speed cars.

Figure 1:
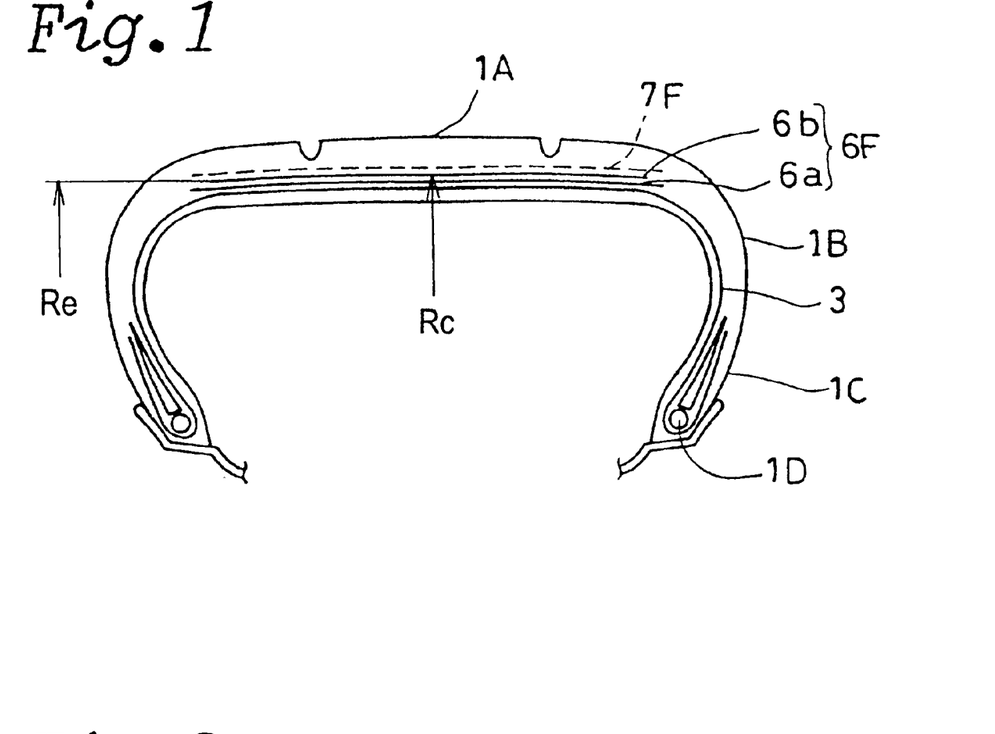
FIG. 1 is a cross sectional view of a radial tire.

Such a radial tire comprises, as shown in FIG. 1, a carcass 3 comprising at least one ply of radially arranged cords extending between bead portions 1C through a tread portion 1A and sidewall portions 1B and turned up around bead cores 1D,

- a belt 6F disposed on the radially outside of the carcass 3 and composed of at least two cross plies 6a and 6b of parallel cords inclined at 10 to 40 degrees with respect to the circumferential direction of the tire, and
- a band 7F disposed radially outside the belt 6F and inside the tread portion 1A and comprising at least one ply of one or more cords wound spirally across the overall width of the belt 6F at an angle of 0 to 5 degrees with respect to the tire circumferential direction.

For the belt cords, high modulus inorganic cords such as steel cords or high modulus organic fiber cords such as aromatic polyamide, polyester and the like are used.

For the band cords, relatively-low-modulus heat-shrinkable organic fiber cords, preferably nylon and the like are used. (For example, nylon 6 or nylon 66; 940 to 1400 dtex/2; cord count 42 to 50 /5 cm)

In this type of tire, the outermost belt ply 6b has a camber (A) in the range of from 2 to 4% of the section width of the tire under a normal inflated state in which the tire is mounted on a standard rim and inflated to a standard pressure but not loaded. This belt camber (A) is a difference Rc-Re between the radii Rc and Re of the radially outermost belt ply measured to the outer surface thereof from the tire axis at the tire equator and the axial edges thereof, respectively.

In the present invention, the method of manufacturing the radial tire comprises processes for

- forming a tread ring 2,
- forming a raw tire main body 4,
- forming a raw tire 5, and
- vulcanizing the raw tire 5.

The process for forming the raw tire main body 4 includes the steps of

- winding raw carcass materials (strip of rubberized parallel cord fabric) around a cylindrical tire drum of a tire building apparatus (not shown),
- winding bead wires around the raw carcass to form the bead cores, and
- turning back the edges of the raw carcass around the bead cores.

The process for forming the tread ring 2 includes the steps of

- winding raw belt materials on a belt drum 10 of a tread ring forming apparatus 1,
- winding one or more cords on the radially outside of the raw belt to form a raw band, and
- winding a raw tread rubber on the radially outside thereof. Thus, the tread ring 2 is an annular assembly of a raw belt 6, a raw band 7 wound thereon and a raw tread rubber 9 wound thereon.

The process for forming the raw tire 5 includes the steps of

Figure 2:
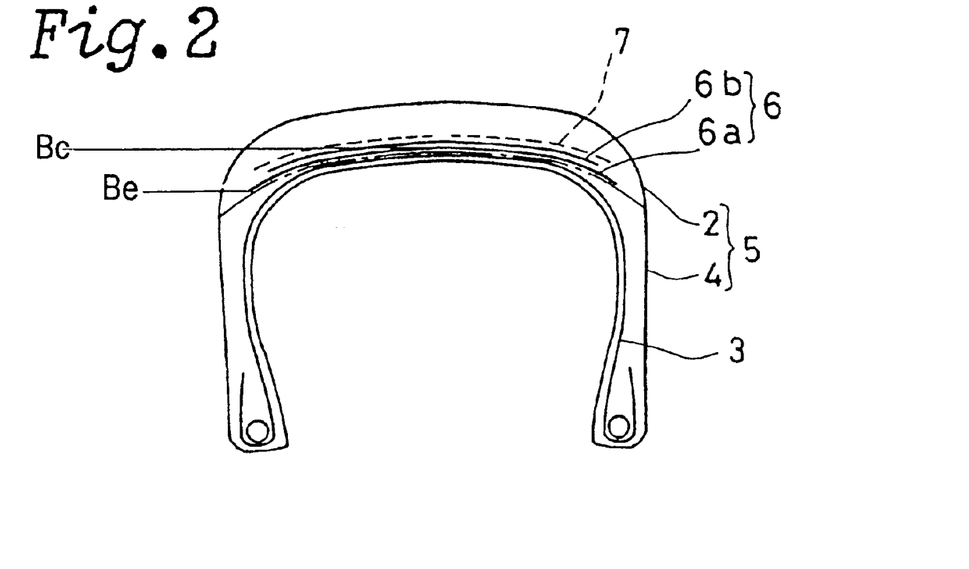
FIG. 2 is a cross sectional view of a raw tire 5 showing a tread ring 2 and a raw tire main body 4.

- inserting the raw tire main body 4 into the tread ring 2,
- swell the raw tire main body 4 into a toroidal shape to press the outer surface thereof onto the inner surface of the tread ring 2, and
- applying other components such as sidewall rubber, bead rubber and the like to the raw tire 5 shown in FIG. 2.

The process for vulcanizing the raw tire 5 includes the steps of

- putting the raw tire 5 in a mold,
- heating the raw tire 5 during pressurizing the inside thereof, and
- demolding the vulcanized tire.

Figure 4:
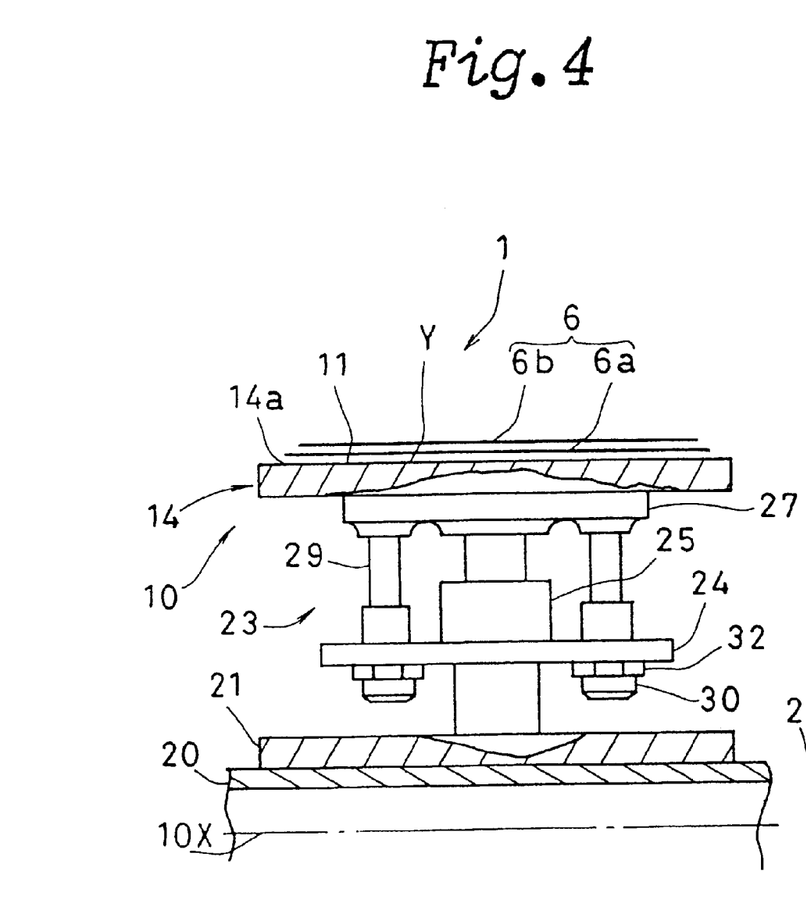
FIG. 4 is a schematic cross sectional partial view of a tread ring forming apparatus 1 taken along the belt drum axis 10X.
Figure 5:
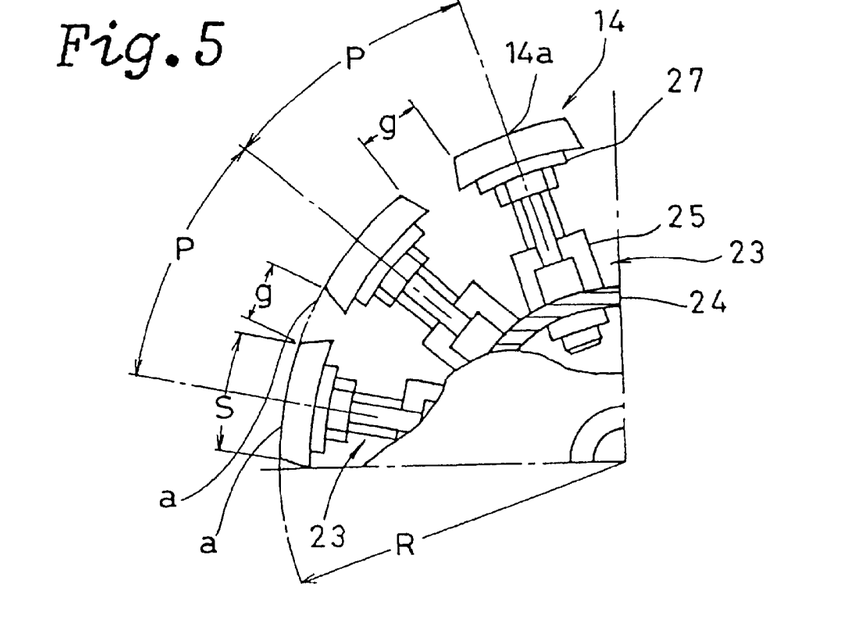
FIG. 5 is a schematic cross sectional partial view of the tread ring forming apparatus 1 taken normal to the belt drum axis 10X.

The above-mentioned tread ring forming apparatus 1 comprises a rotatable drum 10 comprising a plurality of segments 14 arranged around the axis 10X of the drum, and means 23 for retracting and expanding the drum 10.

The retracting-and-expanding-means 23 are linear actuaters 25. For the linear actuaters 25, a hydraulic cylinder is used, but a linkage, screw and the like can be used. The actuaters 25 are mounted on an annular mounting ring 24 at regular intervals in the circumferential direction. An arrangement at irregular intervals is also possible. The annular mounting ring 24 is fixed concentrically with a rotary shaft 20 to a boss 21 inserted by the rotary shaft 20 so as to provide a space between the boss 21 and the ring 24. For example, to the rod ends of the linear actuaters 25, attachments 27 for the segments 14 are fixed. Each attachment 27 is provided with two guide shafts 29 which are fixed thereto to extend radially inwardly therefrom. The guide shafts 29 are slidably inserted into guide holes of the annular mounting ring 24 to prevent a rotational movement of the attachment 27. The guide shafts 29 protrude radially inwardly from the annular mounting ring 24 and the protruding part thereof is provided with a flange 30 for preventing falling-off. Between the radially outer surface of the flange 30 and the radially inner surface of the annular mounting ring 24, a horseshoe-shaped spacer 32 is disposed to adjust the diameter of the drum to various tires. Thus, the spacers 32 having various thicknesses are prepared.

The segments 14 are fixed to the respective attachments 27.

Therefore, the segments 14 can be moved radially outwardly and inwardly by the lengthening and shortening of the linear actuaters 25.

In the expanded state of the drum in which the segments 14 are moved to a radially outer position determined by the spacer 32, the radially outer surfaces 14a of the segments 14 collectively form the belt shaping face 11.

Figure 6:
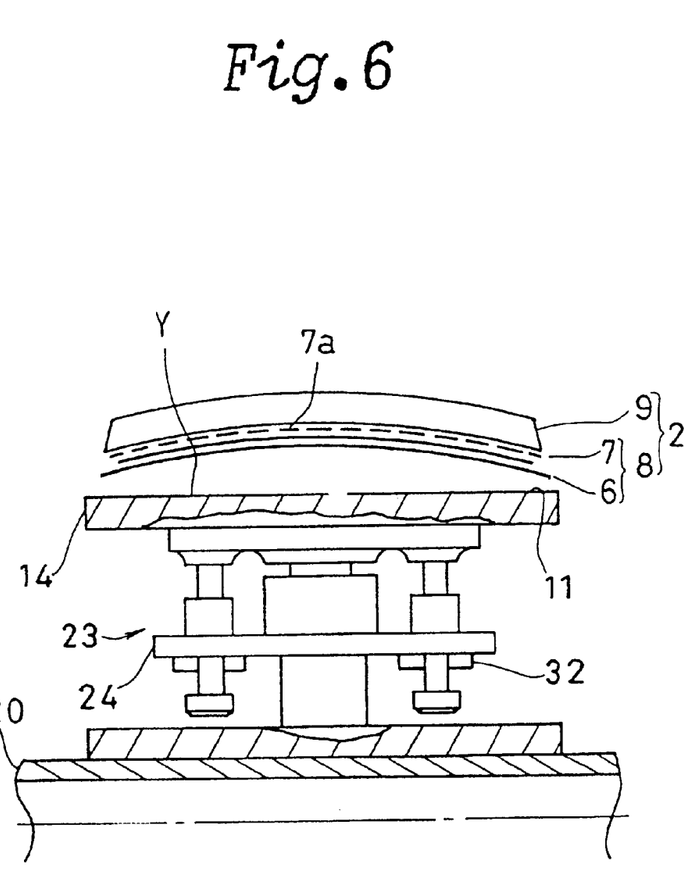
FIG. 6 is a view similar to 4 but the belt drum 10 is retracted.

In the retracted state in which the segments 14 are moved to a radially inner position, the drum diameter becomes smaller than the minimum inside diameter of the the tread ring 2 Thus, the tread ring 2 can be detached therefrom.

In a cross section including the drum axis 10X, the radially outer surface 14a of each segment 14 is a straight line Y parallel to the axis 10X. However, in a cross section normal to the axis 10X, the radially outer surface 14a is an arc. The radius of the arc is substantially equal to that of the belt shaping face 11 or one half of the drum diameter.

In the circumferential direction of the drum, gaps (g) are formed between the radially outer surfaces 14a.

Here, the length of the circumference of the drum 10 (hereinafter simply drum circumference) is defined as the total of the arc lengths of the radially outer surfaces 14a of all the segments 14 and the chord lengths of all the gaps (g).

In the present invention, the drum circumference is decreased from the axial center towards the axial edges of the drum 10 by increasing the total of the chord lengths relatively to the total of the arc lengths. As the chord length is shorter than the arc length S when their pitch angles is the same, the drum circumference can be decreased by increasing the total of the chord lengths relatively to the total of the arc lengths.

Figure 7:
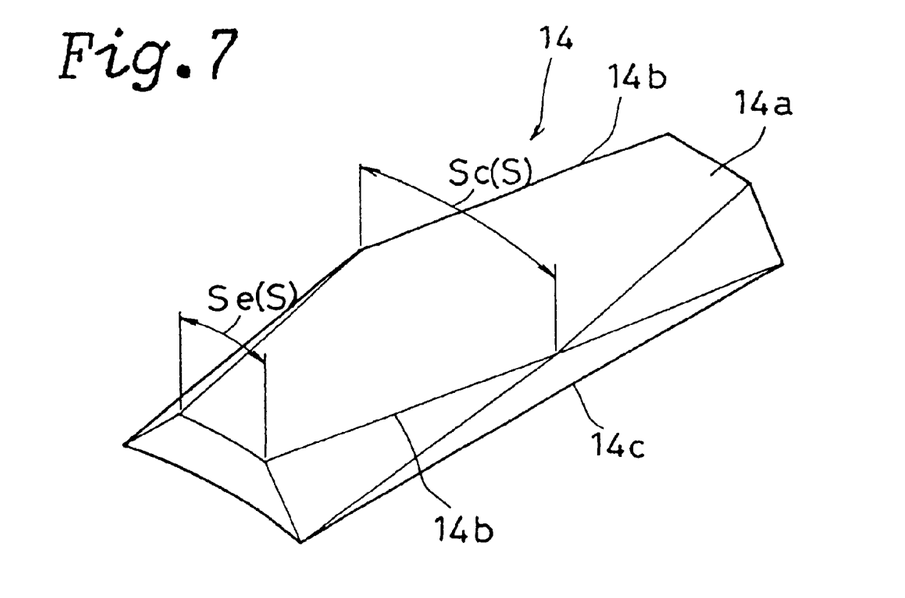
FIG. 7 is a perspective view of an example of the segment 14 of the belt drum 10 showing an example shape of the outer surface 14a thereof.
Figure 9:
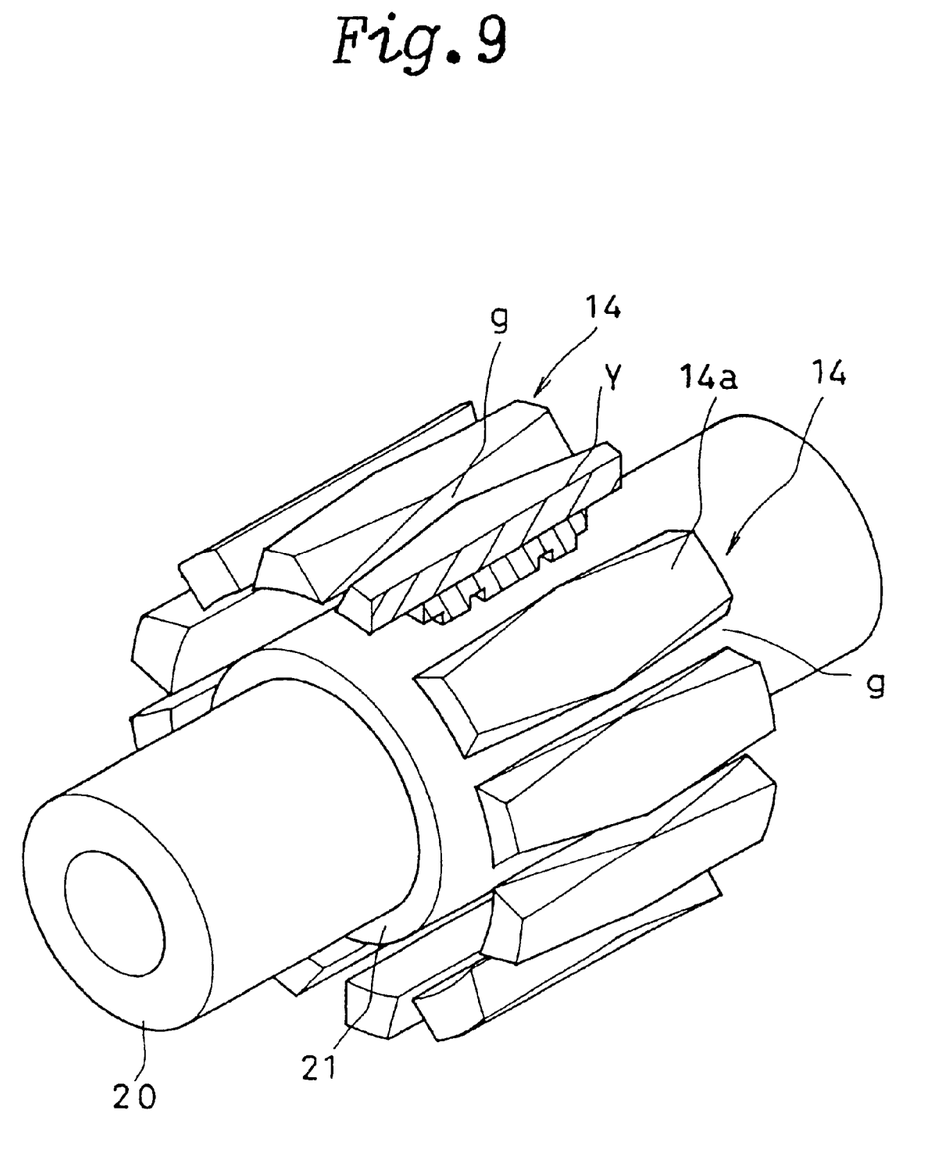
FIG. 9 is a schematic perspective view showing an arrangement of the segments 14.

In the example shown in FIGS. 7 and 9, the outer surface 14a is a generally diamond shape having two opposite short axial edges extending circumferentially of the drum and four oblique longer edges 14b. Thus, the arc length S of the outer surface 14a of each segment 14 is gradually decreased from the center to both the edges. Incidentally, the side face of the segment 14 between the oblique edges 14b and the base 14c is formed by triangular slopes.

Figures 8A, 8B:
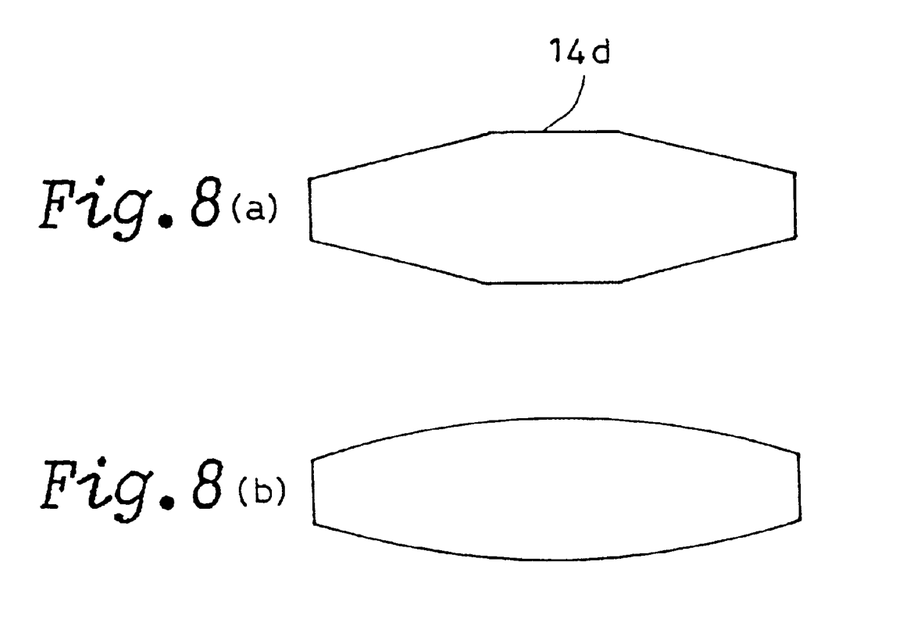

FIG. 8 shows other examples (a) and (b) of the shape of the outer surface 14a. The example (a) is a diamond shape of which the circumferential edges in an axial central part 14d are parallel with the axial direction. The example (b) is a spindle shape of which the circumferential edges are curved. Aside from the foregoing, a rhombic shape and the like can be used.

Figure 10:
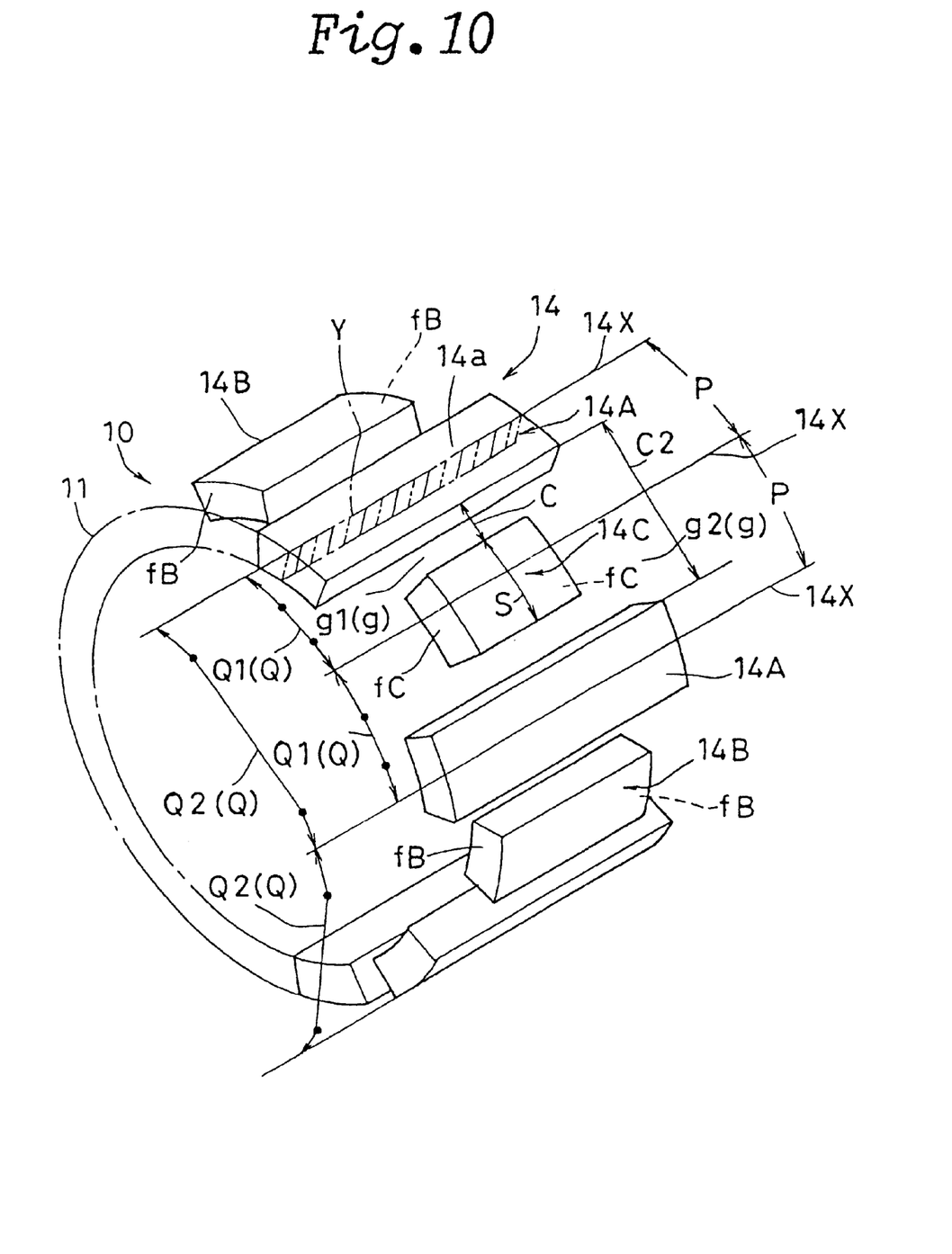
FIG. 10 is a schematic perspective view showing another arrangement of the segments 14 together with another example of the outer surface's shape of the segment 14.

FIG. 10 shows another example of the segments 14.

In the cross section including the axis 10X, the outer surface 14a of each segment 14 is a straight line, but in the cross section normal to the axis 10X, the outer surface 14a is an arc having the substantially same radius as the radius of the expanded dram. These features are the same as the former example.

However, the segments 14, more exactly the outer surfaces 14a, have at least two different axial widths in contrast with the former example having one axial width.

Further, the radially outer surface 14a is a rectangular shape, in which the arc length is constant along the axial direction. It is however possible to use other shapes such as the diamond shape, spindle shape and the like.

The segments 14 must be include long segments 14A of which axial width is more than the belt width and short segments 14C of which axial width is less than the belt width. The axial width is that of the outer surface 14a. Preferably, the number of the long segments 14A is four or more. In this example, the segments 14 further include middle segments 14B of which axial width is less than the belt width but more than the short segments 14C.

The segments 14 are fixed to the attachments 27 aligning the axial centers of the outer surfaces 14a with the axial center of the drum.

Therefore, in the axial central part, the raw belt 6 is supported by all the segments 14A, 14B and 14C, but in the axial edge parts, the raw belt 6 is supported by only the long segments 14A. Further, In the axial middle parts, the raw belt 6 is supported by the long segments 14A and the middle segments 14B.

That is, the gaps are formed on both sides of the middle segments 14B and short segments 14C. The total of the gaps (g) increases from the axial center to the axial edges of the drum by one or more steps, and the ratio of the total chord length to the total arc length increases from the axial center to the axial edges so as to decrease the drum circumference similarly to the former example.

It is also possible to combine the non-rectangular outer surfaces in the former example with the variable axial width in the later example.

The number of the segments is preferably 5 to 32. In this example, twelve segments 14 are used. For example, the drum circumference Me at the edges could be decreased by about 2.6% of the drum circumference Mc at the center when the number of the segments was eight, when twelve about 1.1%, when twenty about 0.5%.

For example, when the belt 6F is composed of two plies of which cord angles are different from each other, the raw belt 6 is formed by winding two strips of rubberized unwoven parallel-cord fabric firstly on the belt shaping face 11 and secondly on the previous winding with the different cord angle. In this stage, the wound raw belt 6 can be a cylindrical shape having the substantially same diameter along the axial direction thereof, and therefore, the wound raw belt 6 crosses the gaps (g) with an arc configuration than a straight configuration.

For example, when the band 7F is composed of one ply extending across the overall width of the raw belt 6, the cord(s) is(are) wound around the radially outside of the raw belt on the drum from one of the belt edges to the other. It is also possible to wind the cord(s) double in the belt edge portions only. Further, it is possible to wind double across the overall width of the belt 6.

Preferably, the above-mentioned one or more band cords are embedded in topping rubber in a form of ribbon, and the raw band 7 is formed by spirally winding the ribbon 7a at an angle of 0 to 5 degrees with respect to the circumferential direction.

During winding the cord(s), a relatively large tension is applied thereto so that the raw band 7 forces the raw belt 6 to extend along the arc of the radially outer surfaces 14a in the places where the segments 14 exist, but in the gaps (g), to extend substantially straight in a cross section normal to the axial direction along the chord length. Thus, in this stage, the raw belt 6 is not a cylindrical shape any more, and the raw band 7 is also not a cylindrical shape. Additionally, the inside circumferences Bc and Be of the raw band 7 and the inside circumferences Lc and Le of the raw belt 6 satisfy the above-mentioned conditions.

Further, a raw tread rubber 9 is wound on the assembly of the raw belt 6 and raw band 7.

As the drum edge circumference Me is smaller than the drum center circumference Mc, the inside circumference Le of the raw belt 6 measured at the edges becomes smaller than the inside circumference Lc thereof measured at the center, and the belt and band assembly has generally a barrel-like shape. Therefore, by winding the tread rubber 9 of a uniform thickness, the tread ring 2 detached from the drum can be a barrel-like shape.

To achieve the desired belt camber, dimensions and curvature of the belt, band and the like in the finished tire, it is important to set these at different values taking into account the estimated expansion of the belt and band during forming a raw tire, and vulcanizing the raw tire in a mold, and due to the inflation of the tire as well known in the art.

Additionally, it is also important to satisfy the following conditions. Thus, the circumference of the belt drum 10 is designed to satisfy the following conditions.

In the tread ring 2, the inside circumference Bc of the raw band 7 at the tire equator is $$2Rc \times \pi \times a$$

and the inside circumference Be of of the raw band 7 at the axial edges of the raw belt is $$2(Rc-A) \times \pi \times a \times b$$

where
　　$0.94 \leq a \leq 0.99$,
　　$0.97 \leq b < 1.0$.

As a result, the raw band 7 properly fastens the raw belt 6 during vulcanization to improve the tire uniformity as well as the high speed durability. The multiplier (a) corresponds to the ratio Rb/Rc of the center radius Rc of the belt 6 in the finished tire and the center radius Rb of the raw belt 6. The multiplier (b) corresponds to a contraction rate in the belt edge. When the belt camber (A) increases to near 4% of the tire section width W, the multiplier (b) is decreased to near 0.97. When the belt camber (A) decreases to near 2% of the tire section width W, the multiplier (b) is increased to near 1.00. If the value (b) is less than 0.97, the tire uniformity decreases in the belt edges, and it becomes difficult to set the belt camber (A) within the desired range. Further, when the raw tire is put in the vulcanization mold, a gap is liable to be formed radially outside the belt edges between the tire and the mold, and as a result, the belt edges are excessively expanded by a high pressure applied to the inside of the tire during vulcanization and a poor tire is liable to be formed.

Figure 3:
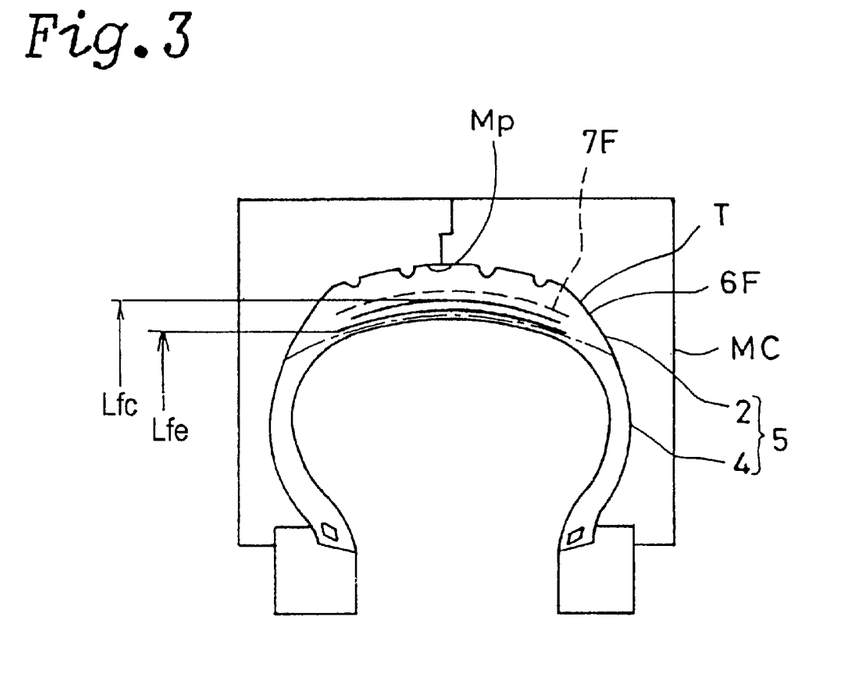
FIG. 3 is a schematic cross sectional view showing a raw tire 5 in a vulcanizing mold MC.

Further, the inside circumference Le of the raw belt 6 at the edges is set to be less than the inside circumference Lfe of the belt 6F in the finished tire T in the mold MC measured at the edges. The inside circumference Lc of the raw belt 6 at the center is set to be less than the inside circumference Lfc of the belt 6F in the finished tire T in the mold MC measured at the center. The difference $\{(Le/Lfe) \times 100\} - \{(Lc/Lfc) \times 100\}$ is set to be 0 to 2 to make the variation of the radius at the edges substantially equal to the variation of the radius at the center whereby the band 7F effectively prevents the belt 6F, especially the edge portions, from being lifted during high speed rotation. If the difference is more than 2 and the elongation at the center is more than the elongation at the edges, the band can not effectively prevent the lifting. If the difference is more than 2 and the elongation at the edges is more than the elongation at the center, when the raw tire is set in the vulcanization mold, a gap is liable to be formed radially outside the belt edges between the tire and the mold, and as a result, the belt edges are excessively expanded by a high pressure applied to the inside of the tire during vulcanization and a poor tire is liable to be formed.

Figure 12:
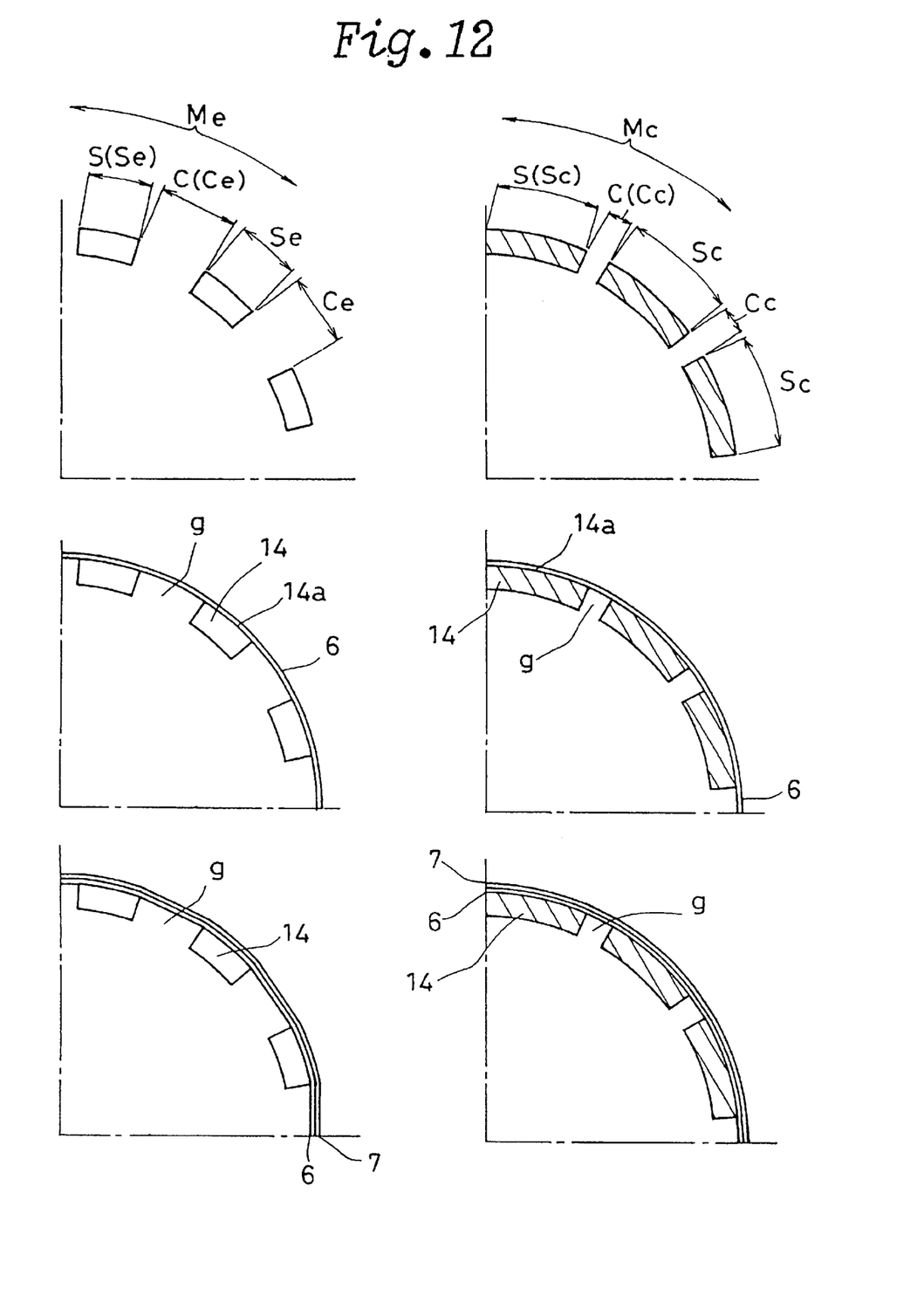
FIG. 12 schematically shows cross sectional views of the belt drum in the center (right side) and edge (left side) when the raw belt is not wound (top), the raw belt 6 is wound (middle) and the raw hand 7 is wound on the raw belt 6 (bottom).

On the other hand, as shown in FIG. 12 (bottom), in a cross section normal to the drum axis 10X, the belt and band assembly on the belt drum 10 has a shape like a polygon, but when detached from the drum, this shape turns to a circle. However, even if the shape turns to a circle, variation of stress is liable to remain between the portions supported by the segments and the portions corresponding to the gaps (g). Although, the stress variation is small, the variation affects the harmonic components of the radial force variation of the finished tire. If for example, five segments 14 are arranged, vibrations of the fifth harmonic component is liable to increase relatively. If stress variations repeat regularly along the tire circumference, a particular harmonic component is amplified at a particular running speed, and the running noise is liable to increases. Therefore, sometimes, it becomes important to prevent the regular repetition of stress variations in the ground contacting width. In order to prevent the regular repetition, preferably the lengths Q between the circumferential centers of the circumferentially adjacent outer surfaces 14a in a cross section normal to the axis 10X are varied. In order to vary these lengths Q, the arc lengths of the outer surfaces 14a of the segments 14 and/or the chord lengths of the gaps (g) can be varied by changing the shapes of the outer surfaces 14a for example by changing the inclination of the oblique edges 14b in case of the segments having a non-rectangular outer surface as shown in FIGS. 7 and 9. In case of the segments having a rectangular outer surface as shown in 10, the circumferential sequence thereof can be changed as follows. Further, in order to vary the lengths Q, it is possible to vary the pitch angles P of the segments, and to set the axial centers of the outer surfaces 14a off the drum center irregularly.

However, when the number of segments is relatively small, and the irregularity is great, the tire uniformity is liable to deteriorate. Further, when the number of segments is relatively large, the stress vibrations can be neglected. Therefore, regular sequence can be employed.

As to the sequence of the axial widths of the segments circumferential direction of the drum, it is possible to use a regular sequence, but preferably a irregular sequence is used.

| Examples of sequence | |
|---|---|
| Number of width | Regular Sequence |
| 2 | LSLSLSLSL |
| 3 | LMSMLMSML |
| 3 | LMSLMSLMS |
| 3 | LSMSLSMSL |
| Number of width | Irregular Sequence |
| 2 | LSLLSLSSL |
| 3 | LMSMLMSLM |
| 3 | LLSMLMSSL |

Figure 11:
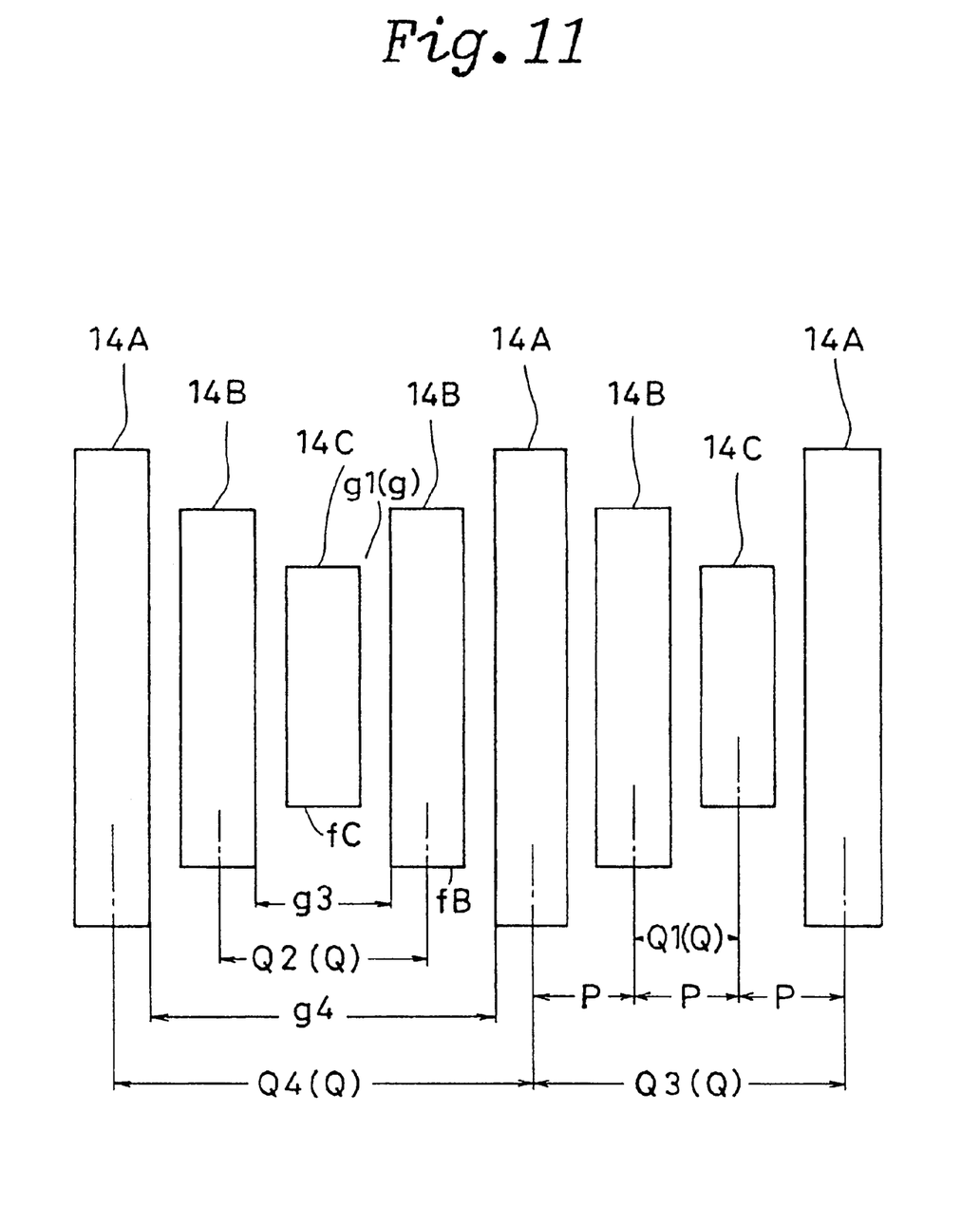
FIG. 11 is a diagram showing a further example of the segments' arrangement.

FIGS. 10 and 11 in which the segments 14A, 14B and 14C are arranged in an irregular sequence, the pitch angles P of the segments 14 are constant (for example, P=360 degrees/12 seg.=30 degrees) as shown in FIGS. 4 and 10. Additionally, the arc lengths S of the segments 14 are the same. However, the chord lengths are not constant. For example, in the axially central region, there are all the segments 14 and small gaps (g1) therebetween. However, in the axial edge region, a wide gap (g2) is formed between two long segments 14A between which a short segment 14c exists. Further, between two long segments 14A between which a short segment 14C and two middle segment 14B exist, a wide gap (g4) is formed. Thus, the distances Q between the center lines 14X of the outer surfaces 14a are uneven depending on the axial position. In any way, it is important that, in a drum width corresponding to the belt width, there are a plurality of distances Q1, Q2, Q3—which do not repeat regularly along the circumference of the drum.

[Comparison Test 1]

Figure 13:
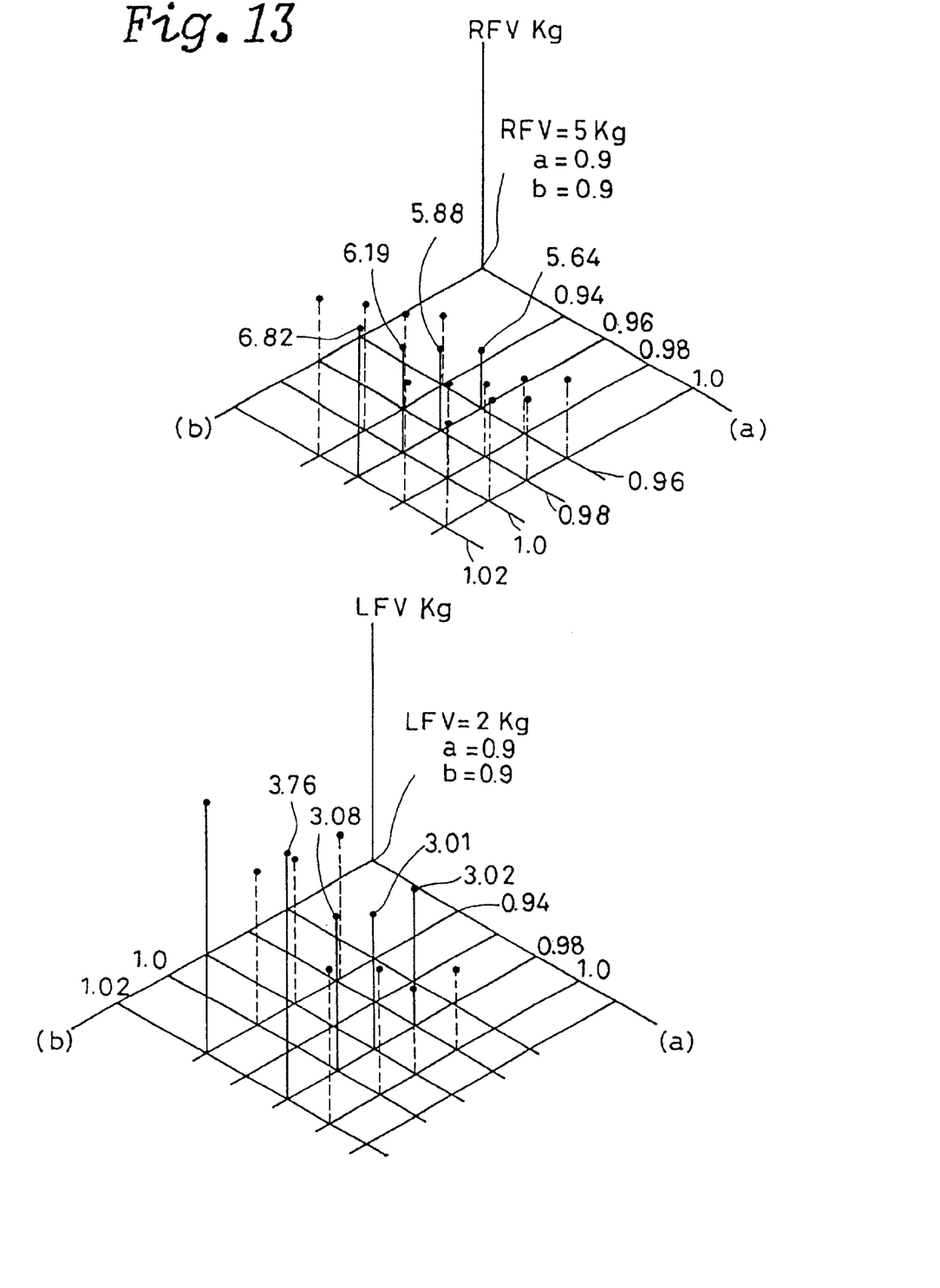
FIG. 13 is diagrams showing relationships between the radial force variation and lateral force variation and multipliers (a and b).

FIG. 13 shows relationships between the multiplier (a, b) and the radial force variation (RFV) and lateral force variation (LFV).

| Tire size | 255/45ZR17 |
|---|---|
| Carcass | 2 plies |
| cord | 1670 dtex/2 polyester |
| cord count | 50/5 cm |
| Belt | 2 plies (steel cords) |
| cord angle | +24, −24 degrees |
| Band | 1 ply (nylon fiber cord) |
| cord angle | almost 0 degree |
| RFV and LFV measuring method: | JASO-C607 |

If (b) is less than 0.96, the belt camber (A) exceeds 4%. When the multipliers (a, b) are in the above-mentioned ranges, good results can be obtained.

[Comparison Test 2]

Figure 14:
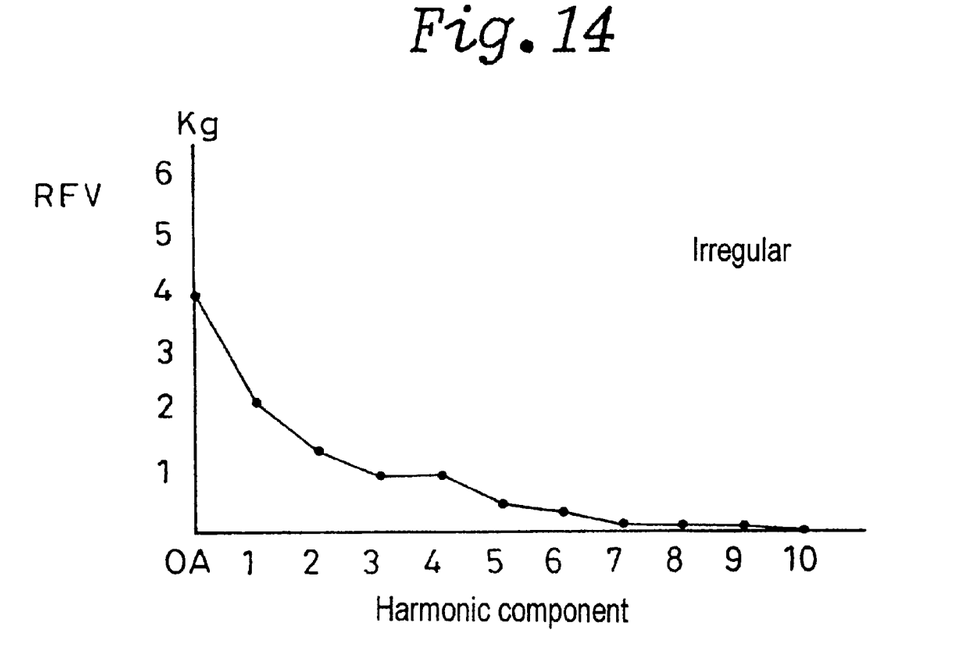
FIGS. 14 and FIG. 15 are graphs showing an effect of irregular arrangement of the segments on the radial force variation.
Figure 15:
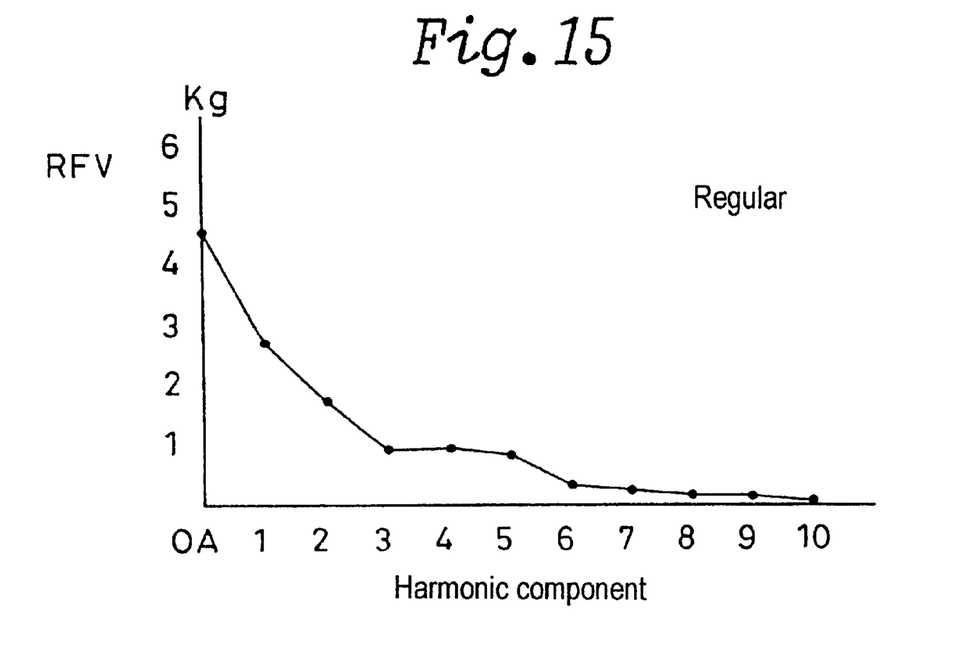

FIGS. 14 and 15 show the results of measuring RFV. The test tires had the following same structure, but the belt drum specifications were different as follows.

| Tire size | 225/50R16 |
|---|---|
| Carcass | 2 plies |
| Cord | 1670 dtex/2 polyester |
| Cord count | 50/5 cm |
| Belt | 2 plies (steel cords) |
| Cord angle | +24, −24 degrees |
| Band | 1 ply (nylon cord) |
| cord angle | almost 0 degree |
| Tire size | 16X7 |
| Inner pressure | 2.0 kgf/sq. cm |
| Tire load | 471 kg |
| RFV measuring method | JASO-C607 |

| Belt drum specifications | | |
|---|---|---|
| Tire | FIG. 14 | FIG. 15 |
| Diameter (mm) | 582 | 582 |
| Segment | | |
| Outer surface | rectangle | rectangle |
| Number | 18 | 18 |
| Arc length S (mm) | 70 | 70 |
| Axial width (mm) | three 250 (l) 175 (m) 100 (s) | constant 250 |
| Sequence | irregular l, m s, m, l, m, m, s, m, s, m, l, m, s, s, m, m, l | regular |

[Comparison Test 3]

Using belt drums having the specifications shown in the following table, test tires having the same structure were made and tested for the high speed durability.

| Tire | Ex. 1 | Ex. 2 | Ex. 3 | Ref. 1 | Ref. 2 |
|---|---|---|---|---|---|
| Segments | | | | | |
| Number | 12 | 12 | 18 | 12 | 18 |
| Shape | diamond FIG. 9 | diamond FIG. 9 | rectangle FIG. 10 | rectangle | rectangle |
| Axial width (mm) | 250 | 250 | 230, 180 and 130 | 250 | 230 |
| Arc length | | | | | |
| Center (mm) | 140 | 140 | 100 | 140 | 130 |
| Edge (mm) | 5 | 20 | 100 | 140 | 130 |
| Sequence | regular | regular | irregular | regular | regular |
| Tread ring Shape | barrel | barrel | barrel | cylinder | cylinder |
| Durability *1 | | | | | |
| Speed | 310 | 305 | 320 | 290 | 300 |
| Time | 20 | 20 | 20 | 18 | 20 |

*1 The speed (km/h) at which a rubber separation failure occurred in the belt edge, and the running time (minute) at the speed.

| Carcass | 2 plies |
|---|---|
| cord | 1670 dtex/2 polyester |
| cord count | 50/5 cm |
| Belt | 2 plies (steel cords) |
| cord angle | +24, −24 degrees |
| Band | 1 ply (nylon cord) |
| cord angle | almost 0 degree |
| Ex. 1, Ex 2 and Ref. 1 | |
| Tire size | 235/45ZR17 |
| Rim size | 17X8 |
| Inner pressure | 3.0 kgf/sq. cm |
| Tire load: | 474 kg |
| Ex. 3 and Ref. 2 | |
| Tire size | 215/45ZR17 |
| Rim size | 17X8 |
| Inner pressure | 3.0 kgf/sq. cm |
| Tire load | 307 kg |

What is claimed is:

1. A method of making a tread ring by the use of a belt drum, the belt drum comprising segments arranged around the axis of the belt drum, the segments being movable radially between a radially inner position and a radially outer position, each segment having a radially outer surface, the radially outer surfaces of the segments in the radially outer position collectively forming a belt shaping face for supporting the radially inside of a belt material, the method comprising the steps of forming a raw belt by winding a strip of rubberized high modules cords on the belt shaping face, and forming a raw band by winding at least one organic fiber cord on the radially outside of the raw belt at an angle of 0 to 5 degrees to the circumferential direction of the drum, wherein the inside circumference Lc of the raw belt at the axial center is more than the inside circumference Le of the raw belt at the axial edges so that the assembly of the raw belt and the raw band has a generally barrel shape, and applying a strip of raw tread rubber on the radially outside of the assembly of the raw belt and the raw band to form a tread ring, wherein the radially outer surfaces of the segments are an arc in a cross section normal to the axial direction, and said belt shaping face is provided between the radially outer surfaces of the segments with gaps providing no radial support for the wound belt, so that the total of the gaps is wider in the edges of the belt than the center thereof, and in the step of forming a raw band, said at least one organic fiber cord is wound at a tension such that the raw band forces the raw belt to extend along the arc of the radially outer surfaces in the places where the segments exist to provide a radial support, but in the gaps, to extend substantially straight in a cross section normal to the axial direction.

2. The method according to claim 1, wherein the raw belt has a cylindrical shape before forming the raw band, but after forming the raw band, the raw belt has a generally barrel shape such that the inside circumference thereof gradually decreases from the axial center thereof towards the axial edges.

3. The method according to claim 1, wherein in the step of forming a raw band, a ribbon of rubber in which said at least one organic fiber cord is embedded is wound.

4. The method according to claim 1, wherein said inside circumference Lc of the raw belt at the axial center, said inside circumference Le of the raw belt at the axial edges, and the inside circumference Lfc at the axial center and the inside circumference Lfe at the axial edges of the belt in a finished tire in a tire vulcanizing mold are Le<Lfe, Lc<Lfc, $0 \leq \{(Le/Lfe) \times 100\} - \{(Lc/Lfc) \times 100\} \leq 2$.

5. The method according to claim 1, wherein the radially outer surface of each segment decreases in the arc length from the center towards each edges of the segment so that the total of the gaps becomes wider in the edges of the belt than the center thereof.

6. The method according to claim 1, wherein the radially outer surface of each segment has a substantially constant arc length from one edge to the other edge of the segment, but the radially outer surfaces of the segments have at least two axial widths including a maximum axial width more than the axial width of the belt and an axial width less than the axial width of the belt so that the total of the gaps providing no radial support becomes wider in the edges of the belt than the center thereof.

7. The method according to claim 5, wherein, in a circumference of the drum defined as the total of the arc lengths of the segments and chord lengths of the gaps, the circumferential lengths between the circumferential centers of the arcs of the adjacent segments are varied in the circumferential direction by changing the arc lengths and/or the chord lengths.

8. The method according to claim 6, wherein in a circumference of the drum defined as the total of the arc lengths of the segments and chord lengths of the gaps, the circumferential lengths between the circumferential centers of the arcs of the adjacent segments are varied in the circumferential direction by employing an irregular arrangement of the segments.

* * * * *